United States Patent [19]

Cartier et al.

[11] Patent Number: 4,806,139
[45] Date of Patent: Feb. 21, 1989

[54] PERMANENT ANTI-ADHERENT COATING FOR GLASSMAKING MOULDS AND ASSOCIATED EQUIPMENT

[75] Inventors: Michel Cartier, Chalain-Le-Comtal; Jean-Paul Farjaudon, Saint-Just-Saint-Rambert, both of France

[73] Assignee: Centre Stephanois de Recherches Mecaniques Hydromecanique et Frottement, Andrezieux-Boutheon, France

[21] Appl. No.: 137,018

[22] Filed: Dec. 23, 1987

[30] Foreign Application Priority Data

Dec. 30, 1986 [FR] France ............... 86 18378

[51] Int. Cl.⁴ .................... C03B 9/30; C03B 11/06
[52] U.S. Cl. .............................. 65/170; 65/26; 65/169; 65/374.12
[58] Field of Search ............... 65/374.12, 26, 169, 65/170

[56] References Cited

U.S. PATENT DOCUMENTS

| | | | |
|---|---|---|---|
| 2,201,049 | 5/1940 | Moore | 49/65 |
| 2,212,984 | 8/1940 | Greed | 49/65 |
| 3,994,703 | 11/1976 | Newing, Jr. et al. | 65/26 |
| 4,003,867 | 1/1977 | Cooper et al. | 260/17.5 |

FOREIGN PATENT DOCUMENTS 2130242  5/1984  United Kingdom .

OTHER PUBLICATIONS

Pleskach et al. "Experience with Electric-Spark Alloying to Increase the Wear Resistance of Glass Molds", Glass and Ceramics, vol. 37, Nos. 1,2, Jan.-Feb. 1980, pp. 81, 82.

Yoshio et al. "Adherence of Glass to Metal at Elevated Temperature", Asahi Garasu Kenhyu Hokoku, No. 15, 1965, pp. 103-112.

Primary Examiner—Arthur Kellogg
Attorney, Agent, or Firm—Young & Thompson

[57] ABSTRACT

In the production of moulded glass articles, difficulty arises from the risks of adhesion of the glass to the surfaces of the mould, which is made unserviceable, at least for a time. A permanent anti-adherent coating for glassmaking moulds is provided on the mould cavity surfaces, by a metal layer comprising a molybdenum alloy containing 30 to 55% Mo and less than 4% iron. The metal layer may also contain nickel and chromium in significant quantities.

5 Claims, 1 Drawing Sheet

PERMANENT ANTI-ADHERENT COATING FOR GLASSMAKING MOULDS AND ASSOCIATED EQUIPMENT

BACKGROUND OF THE INVENTION

1. Field of the Invention

The invention relates to a permanent coating for metal equipment for the shaping of a mass of formable glass, especially glassmaking moulds, the coating being provided in order to prevent any sticking of the mass of glass to the surfaces with which it comes into contact.

In the quantity production of hollow glass articles, three principal moulding processes are used: blowing a parison in a mould, pressing a gob of glass, of predetermined size, between a die and a punch, and centrifugal casting. The last-mentioned process is used mainly in the manufacture of special articles; pressing is largely used in the manufacture of industrial articles, such as glass paving-blocks, table-ware and certain articles of hollow-ware; blow moulding is used almost exclusively for making bottles and flasks, and to a great extent for hollow-ware.

Whichever process is used, the external shape of the article (and equally its internal shape in the case of pressing) is determined by the shape of an internal cavity of a metal mould against the surfaces of which the glass, brought to a temperature at which its viscosity has an appropriate value, is pressed against the mould surfaces so as to assume their shape and become sufficiently cooled to be solidified in this shape, that is to say to have acquired a high enough viscosity not to suffer any significant deformation in the course of handling.

It will be recalled that the working level of a glass is the level of temperature at which the glass has a viscosity high enough for the glass to deform only slowly, but low enough to enable it to deform under the influence of moderate forces. In addition, all glasses possess a transformation point at which the expansion curve shows a knee and below which rapid cooling sets up internal stresses. It is generally accepted that the viscosity of glasses at the transformation point is $10^{14}$ Pa.s.

In quantity production, metal moulds are used which have sufficiently high thermal conductivity to solidify the glass rapidly by contact. This conductivity is all the more necessary as the moulds must be hot enough before moulding to avoid cooling of the glass when they make contact below the transformation point. Currently the metal most commonly used is cast iron, having a stable shape when hot, and being easy to work with fine polishes, and relatively less susceptible to sticking than the steels; some special steels (refractory non-oxidising) are also used; alloys of copper have been employed to facilitate cooling of the glass and maintenance of the mould temperature at high production rates. These alloys are being used less and less.

It goes without saying that it is necessary to prevent the glass from sticking to the walls of the mould, adhesion being liable to cause on the one hand superficial tearing of the article being moulded, and on the other hand poor stripping of the glass along the mould surfaces, with local restraint of its sliding movement. There is then a risk of the fault being repeated on articles to be moulded subsequently, if the adhered glass is not cleaned from the mould. These operations to restore the moulds lead to loss of production, and premature wearing out of the moulds due to the abrasive character of the glass.

It is known that adhesion of glass to a metal results from partial solution exchange between an oxide film formed on the surface of the metal, and constituent oxides of the glass (basically silica, lime and soda for current soda-calcium glasses). Adhesion varies greatly with temperature, which determines the growth of the oxide layer on the metal, and the rates of diffusion of the oxides one into another.

2. Description of the Prior Art

Conventionally, adhesion of the glass to the mould surfaces is prevented by coating the latter with a stripping agent.

The stripping agents most commonly in use consist of graphite suspensions with a binder, which is pulverised on to the mould surfaces. The binder itself adheres to only a limited extent, after the liquid in which it is suspended has evaporated and the mould has been heated to its working temperature; friction between the viscous glass and the mould surfaces results in local erosion of the graphite layer. It is therefore necessary to apply the graphite suspension afresh so as to restore the layer of stripping agent.

In certain cases, carbon black, obtained by sooty combustion of a hydrocarbon (propane, acetylene) is deposited on the mould surfaces.

It has been proposed to treat the internal cavity of the moulds with nickel so as to reduce the tendency to stick. This treatment is performed by displacing nickel with the iron of the mould in a solution of a nickel salt (chemically referred to as nickelising). Nickelising ought to reduce the tendency towards oxidation of the moulds. The resulting improvement has however proved to be insufficient to allow pulverisation of a stripping agent to be omitted.

The document U.S. Pat. No. 4,003,867 describes a coating composition based on pigment and aluminium phosphate. The coating layers are substantially thicker than the layers of carbon suspension, being in a range between 0.025 mm and 0.4 mm, and the coating is cured at between 105° and 760° C. It is to be noted that, when the coating is applied to the surfaces of a glassmaking mould, the pigment is powdered graphite, while for other applications, such as the coating of steel billets, the pigment may be of molybdenum bisulphide, mica, talc, powdered glass, or another lubricating pigment.

In a glassmaking mould, such a coating, of 0.15 mm, may last for 96 hours.

At the present time, it does not appear that the type of coating taught by U.S. Pat. No. 4,003,867 is in current use. It may be thought that, on the one hand, the surface condition of this covering is insufficient, and that, on the other hand, the presence of the covering renders the shape of the glass article imprecise and makes accurate closure of the mould difficult, since the presence of the coating surfaces in the plane of the joint of separation of the mould prevents a perfect fit.

Adhesion of glass to the equipment associated with glassmaking moulds, such as troughs and chutes for delivering viscous glass to the moulds, can be avoided by using coatings similar to those which are proposed for glassmaking moulds.

Thus, document U.S. Pat. No. 3,994,703 teaches the protection of troughs for guiding a charge or parison of glass towards a forming station, by means of a coating composed of a lubricating pigment, graphite or molybdenum bisulphide, with a thermosettable polymer as binder, resistance to wear or abrasion being augmented by the presence, between the substrate and the coating, of a porous supporting layer consisting of a transition metal with a transition metal carbide or nitride.

SUMMARY OF THE INVENTION

The invention has as an object thereof the provision of a durable coating for glassmaking moulds and associated equipment, having an efficacy comparable to those of modern coatings of pulverised graphite, and having a shape which is definable with the degree of mechanical precision that is a feature of conventional moulds.

To this end, the invention proposes a surface coating for metallic apparatus for shaping a mass of viscous glass, especially glassmaking moulds, with a view to avoiding any adhesion of the mass of glass on the surfaces with which it comes into contact, characterised in that it consists of a metal layer comprising, by weight, at least 30% molybdenum and less than 4% iron, disposed on at least those surfaces coming into contact with the glass.

Various processes are known, such as spraying under inert gas, plasma torch, or pulverisation under reduced pressure, for example cathodic magnetron pulverisation, for depositing a molybdenum layer which can if necessary be subsequently machined or polished.

It is unexpected, to those familiar with the art, who are aware of the excellent weldability of glass to molybdenum, especially in providing an impervious path for a metallic conductor through a glass wall, that molybdenum, or an alloy rich in this metal, can be seen as a coating material capable of preventing the adhesion of glass to the surfaces of a glassmaking mould.

Preferably, the metal layer comprises at most 55% by weight of molybdenum. In addition, apart from the molybdenum, this layer comprises essentially nickel and chromium.

For preference the mass of viscous glass consists of a parison blown in the cavity of a mould. Blow-moulding is the process for moulding glass articles for which production rates are the highest, while the forms of the cavities at the same time render frequent application of a pulverised stripping agent more difficult.

Preferably, the metal layer has a thickness in the range between 0.5 and 0.005 mm, and more preferably between 0.008 and 0.12 mm.

It is preferred that the surface roughness Ra of the metal layer be between 0.02 and 1 $\mu$m.

DESCRIPTION OF THE INVENTION

Development of the invention began with an apparatus for measuring the hot adhesion of glass to a substrate, and the establishing of a significant correlation between the measurements of adhesion obtained, and the risks of adhesion of the glass to the surfaces of a glassmaking mould.

Figure 1:
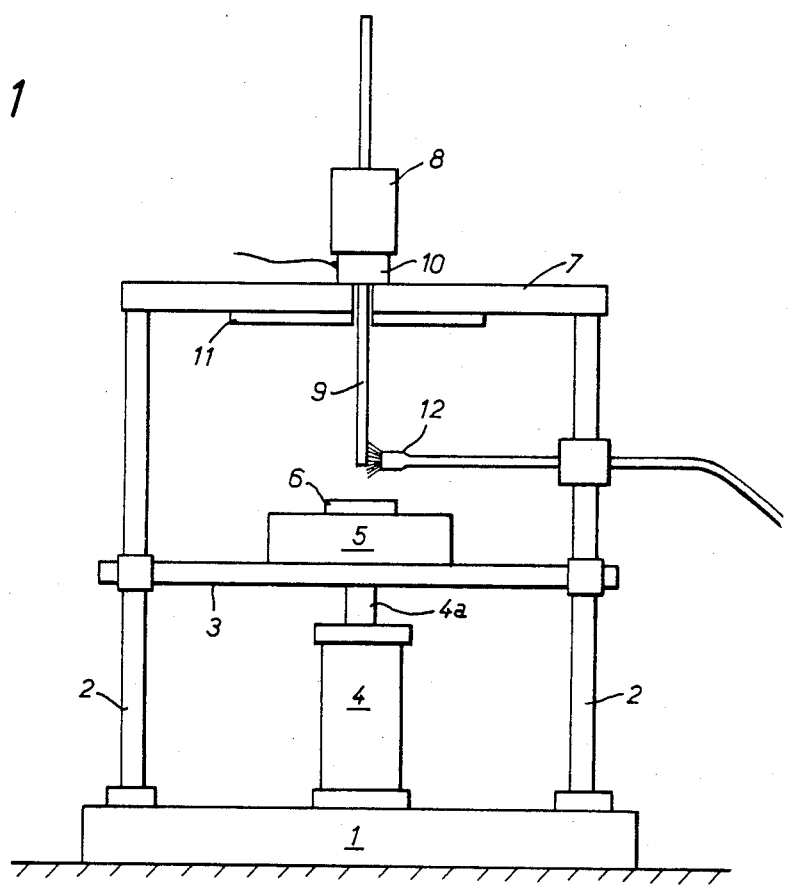
FIG. 1 shows schematically an apparatus for measuring the adhesion of a substrate to a glass gob.

The apparatus shown in FIG. 1 comprises a baseplate 1 which carries vertical columns 2 for supporting a platform 7 parellel to the baseplate 1.

In the centre of the baseplate there is disposed a jack 4, the ram 4a of which is arranged to push a vertically-movable platen 3, which is guided parallel to the baseplate 1 by the columns 2.

At the centre of the platen 3 there is fixed a heating anvil 5, on which a substrate 6 can be clamped.

The platform 7 is pierced through its centre by an opening 7a through which a glass rod 9 can pass vertically. This rod is held in a chuck 8 which rests on the platform 7 through an electro-mechanical force detector 10 of annular form.

The lower face of the platform 7 is provided with a thermal shield 11.

A burner 12, fixed to one column 2, is arranged at a height level with the bottom end of the glass rod 9, in such a way that this rod is located in the hot part of the flame. The burner 12 can be disengaged by rotation about the column 2.

A test is carried out as follows:

A glass rod, having a composition corresponding substantially to that of the glass which is to be used in the moulding of the articles, and 5 mm in diameter, is held in the chuck 8 so as to extend through the platform 7 via the orifice 7a, in such a way that its bottom end lies at a distance from the anvil 5 smaller than the stroke of the ram of the jack 4.

A test substrate 6 is clamped on the heating anvil 5, and is heated to a measured temperature, chosen to be similar to that of a glassmaking mould, that is to say in the range 600°–650° C.

After the substrate has fully reached the chosen temperature throughout its mass, the flame of the burner 12 is applied, progressively so as to avoid thermal shocks, to the end of the rod 9, in such a manner as to heat the rod to a temperature at which the glass is soft enough for the tip of the rod 9 to deform into a globule, though without dripping; the viscosity is then similar to that of a parison.

At this moment the burner 12 is extinguished, and the jack 4 is extended in such a way that the substrate 6 is applied to the end of the rod 9 with a force of 50 da N. This force is measured as the algebraic difference between the forces on the force detector 10.

After a sufficient time, which is determined experimentally and reproduced in subsequent experiments, the glass at the tip of the rod becomes solidified and is then at a temperature close to that of the substrate. The expansion force of the jack is relaxed, and the jack is then progressively retracted, while the forces are monitored by the force dectector 10. At a particular instant the substrate 6 becomes detached from the end of the rod 9. The difference between the forces exerted before and after this disengagement constitutes what may be referred to as the adherence force.

A first phase of tests was carried out with conventional substrates of P1, G2 and V900 cast iron, polished to a roughness Ra of 0.04 $\mu$m, and taking adherence forces at increasing blowing temperatures of 500°, 550°, 575°, 600°, 630° and 650° C.

Figure 2:
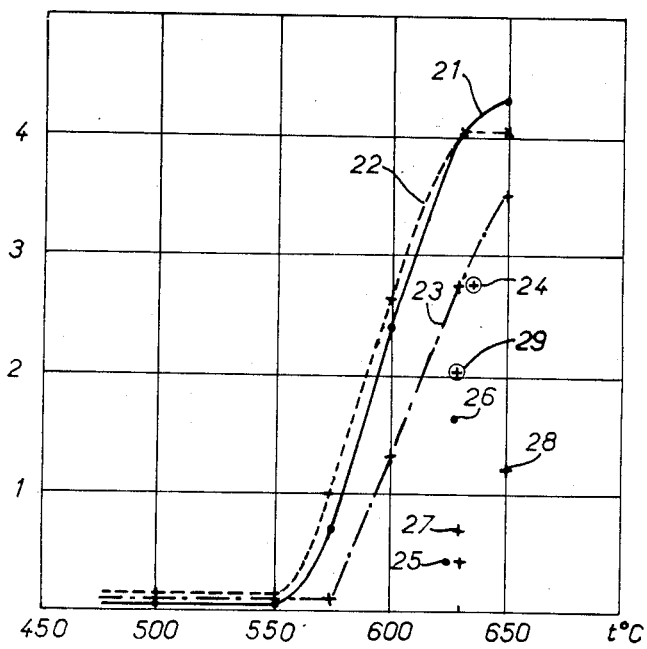
FIG. 2 is a diagram respresentative of the adhesive forces between various substrates and glass, including substrates according to the invention.

The results are plotted in the curves 21, 22 and 23, corresponding respectively to P2, G2 and V900 cast irons, in the diagram shown in FIG. 2. The substrates had a surface finish polished to mirror quality (Ra being between 0.02 and 0.04 $\mu$m), corresponding to the surface finish of the moulds.

From these curves the following conclusions have been drawn:

The general trend shown by the curve shows, towards the lower temperatures, a "plateau" of very low adherence (of the order of 0.1 to 0.2 da N), then a steeply-rising part, starting at about 550° C. for the P1 and G2 samples, and 575° C. for the V900 sample, followed by a part which tends towards an asymptotic value of around 4 da N.

These trials have proved to be substantially reproducible and relatively free of dependence on the temperature at the end of the rod 9, in the sense that, although the application of the substrate 6, which deforms the end of the rod, can result in contacting surfaces having a diameter between 5 and 10 mm, which corresponds to a contact pressure between 2.5 and $10^5$ and $6 \times 10^4$ Pa, the separation force, for a given temperature of the substrate 6, varies little for each type of substrate.

It is pointed out that the temperature of the substrate 6 is taken in the neighbourhood of the heating anvil 5, and that the surface temperature may be less, from 50° to 80° C.

It is apparent that the amount of the adherence force was significant at a substrate temperature (as measured) of 630° C., which substantially corresponds to that of glassmaking moulds.

Furthermore, it has emerged that the variations revealed in the adherence forces on substrates of the P1, G2 and V900 materials correspond to the empirical variations of the risks of sticking on moulds.

This correlation is confirmed with a test on a substrate made of a chemically nickelised P1 material (point 24 on the diagram), in which the adherence force has been raised to 2.8 da N, which is better than for the bare P1 and G2 materials, and practically equivalent to the V900 material: these results correspond to those appearing empirically under production conditions.

Tests using conventional glassmaking stripping agents, of the kinds mentioned earlier herein, have moreover given adherence forces in the range 0.5 (point 25 in FIG. 2) and 1.6 da N (point 26), which is consistent with the experience of the person skilled in the art.

Further tests, on substrates in materials having roughness Ra of 0.2 $\mu$m, have revealed adherence forces in the ranges 5 to 7.5 da N. another test with zirconium oxide surface layer, the solubility in glasses of which is known, has shown an adherence force of 40 da N.

In this way the Applicant has discovered that a molybdenum layer deposited on a substrate gave (point 27 in the diagram) an adherence force of 0.6 da N, this value being substantially independent of the method by which the layer was applied (pulverisation under inert gas, plasma torch, cathodic magnetron pulverisation), independent of its thickness, and independent of its surface condition (Ra between 1 $\mu$m and 0.02 $\mu$m).

Whether the phenomenon of a reduction in sticking was repeated with molybdenum alloys such as Triballoy 700 (Registered Trade Mark) (Mo 32%, Ni 50%, Cr 15%, Si 3%), has been investigated.

Such an alloy has been shown in a first approximation to be substantially equivalent to the V900 material, or to the chemically nickelised P1 material.

Furthermore, point 28 (650° C.–1.2 da N) corresponds to a molybdenum coating on the V900 material, which is capable of working at a higher temperature than the P1 and G2 materials.

The mechanism of reduction in sticking to molybdenum has itself not been clearly elucidated. It is however known that oxidation of molybdenum becomes significant between 600° and 700° C., with formation of molybdenum anhydride $MoO_3$, the sublimation of which begins towards 600° C. An analogy may be postulated between this mechanism and that for graphite, the oxides of which are gaseous.

The test with Triballoy 700 (Registered Trade Mark), which shows an adherence force a third lower than that of cast iron, and which comprises 30% molybdenum, suggests that the efficacy of molybdenum is a function of the ratio between the surface which it occupies and the total substrate surface.

The Applicant, wishing to clarify this point more precisely, has carried out a series of tests with substrates which were covered with layers of molybdenum alloys, obtained by spraying with the plasma torch mixtures of powders of molybdenum and of Triballoy 700 (Registered Trade Mark). The mean results for adhesion of 630° C., according to the proportion of molybdenum in the projected alloy, are set out in the following table:

| Proportion of Mo by weight | Adherence force |
| --- | --- |
| 100% (repeat) | 0.6 da N |
| 80% | 1.1 da N |
| 66% | 1.4 da N |
| 50% | 1.85 da N |
| 30% (Triballoy 700, Registered Trade Mark) | 2.8 da N |

It is therefore concluded that variation in adherence force is a substantially linear function of the proportion of molybdenum, at least up to 50%. Moreover, in the range 50 to 100% molybdenum, the adherence forces remain of the same order as those which are found with stripping agents.

That the behaviour of molybdenum in relation to glass was nearer to that of a substrate coated with a stripping agent than to that of the cast irons used for making the moulds was established with the aid of a test using a similar test rig to that of FIG. 1, but with the heated substrate inclined at about 30° to the horizontal, and, instead of the platen 3 being raised, heating of the bottom end of the glass rod was delayed until the gob descended onto the substrate, leaving a thread between itself and the rest of the rod. In these conditions, the gob then, by twisting the thread, rolls on a substrate of polished cast iron; on a substrate having a molybdenum layer, even with a roughness as great as Ra=1 $\mu$m, the gob slides without rolling; a substrate of cast iron on which a stripping agent has been pulverised induces the same behaviour in the gob, i.e. sliding without rolling.

For test purposes, glassmaking moulds were provided with a molybdenum layer applied using a plasma torch. The thickness of the layers was fixed at 0.1 mm, which seemed to be a good compromise between longevity of the moulds and resistance to thermal shock; the coefficient of dilatation of cast iron is higher than that of molybdenum, so that a thick layer involves a risk of scaling when the mould is heated.

However, extended tests during production, and systematic ageing tests at 600° C., have revealed that those coatings which contain 60% and more of molybdenum became degraded more quickly than coatings with lower amounts; such degradation, which was due to oxidation, resulted in a significant loss in the cohesion of the coating. Similarly, the presence of traces of molybdenum trioxide has been found on pieces of the moulded glass with coatings having 60% and more of molybdenum.

It is thus indicated that coatings with more than 55% by weight of molybdenum should not be used. It is also to be noted that the price of the coatings increases with their molybdenum content.

The narrowness of the range of molybdenum content prompted a review of the tests carried out with coatings having less than 50% of molybdenum, and especially with Triballoy 700 (Registered Trade Mark) (Mo 32%, Ni 50%, Cr 15%, Si 3%).

From determinations of the actual composition of a layer of Triballoy (Registered Trade Mark), an iron content of 8% has emerged. This iron content resulted from the fact that, in order to improve the bond between the coating and its substrate in the P1 material, a process of spraying and fusion had been operated in order to ensure that there would be mutual diffusion of the metals on the two sides of the interface. In Triballoy (Registered Trade Mark), the diffusion of iron was substantial.

Coatings in Triballoy (Registered Trade mark) were then prepared without fusion of the layer. The controlled iron content appeared to be less than 2% by weight. Correlative measurements of adherence force, following the process described above, showed a force of 2.0 da N (point 29 in the diagram of FIG. 2) instead of the previous 2.8 (point 24 in the diagram).

Measurements were then taken corresponding to an alloy containing 50% of molybdenum (see the Table). This 50% alloy produced an adherence force of 1.65 da N, in place of the previous 1.85, appropriate precautions being taken to ensure that the iron content would be greater than 2%.

The influence of iron on the adherence force with high molybdenum alloys has been confirmed by tests with Hastelloy B (Registered Trade Mark) (Mo 28%, Ni 67%, Fe 5%), giving an adherence force of the order of 2.8 da N.

It is interesting to consider that an article in the Japanese review "Asahi Garasu Kenkyu Hokoku", No. 15, 1965, pages 103–112, by T. Yoshio and M. Hara, deals with tests on the adhesion of metals to glasses, in order to determine what coatings are preferable for the press-forming of glass; and this concludes that the preferred metal is far from being nickel. Certain tests were carried out on compositions described as being composed of iron and nickel, including Hastelloy B (Registered Trade Mark). The authors conclude that Hastelloy B (Registered Trade Mark) has properties that are relatively favourable, though generally inferior to those of pure nickel, since iron and nickel both retain their own adhesive properties when in the alloyed state. The effect of molybdenum was not dealt with. It can be postulated that this effect of molybdenum was masked by the presence of 5% iron.

Tests on coating glassmaking moulds with Triballoy 700 (Registered Trade Mark) have confirmed that inhibition of adherence by the glass has been obtained, and that the coatings do not suffer from premature degradation.

Coatings with a molybdenum content between 30 and 55% by weight have been shown to be equally efficacious for use on the surfaces of associated equipment, especially troughs and chutes for delivering viscous glass to the moulds. It will be noted that these items of equipment operate at mean temperatures lower than the glassmaking moulds, since they are not required to cool the viscous glass. To the extent to which the hypotheses as to the effect of sublimation of molybdenum trioxide are valid, it may be estimated that the coating surface assumes, in a transitory manner, a temperature in excess of 600° C., at which the trioxide undergoes substantial volatilisation.

Be that as it may from an experimental standpoint, the sliding properties obtained in the troughs and chutes in which the parisons are conveyed, using coatings containing 30-55% of molybdenum, are comparable in quality to the usual lubricant lacquers and varnishes, with a long life which is not comparable to such lacquers and varnishes.

With regard to the long life of the coatings, it should be understood that long life should not be considered primarily in the sense that it leads to economy on maintenance costs and on the cost of restoring the moulds and their associated equipment, but rather in the sense that this long life makes it probable that, in a production run of say twenty-four hours, on a machine such as a bottle blow-moulding machine, the chance of failure of a mould or of an item of connected equipment will be minute. In this connection, if production using such a machine is stopped for a substantial period of time for the purpose of changing a faulty part, it is practically impossible to restart the production.

What we claim is:

1. In an apparatus for the shaping of a mass of viscous glass wherein said glass mass is formed into a desired shape by contact with a forming surface, the improvement wherein said forming surface with which said glass mass comes into contact consists of a metallic layer comprising 30 to 55 percent by weight of molybdenum and less than 4 percent by weight of iron.

2. The apparatus of claim 1 wherein said metallic layer consists essentially of molybdenum, nickel and chromium.

3. The apparatus of claim 1 wherein said metallic layer has a thickness in the range of about 0.12 to 0.008 mm.

4. The apparatus of claim 1 wherein said metallic layer has a roughness Ra in the range of 0.02 to 1 $\mu$m.

5. The apparatus of claim 1 wherein said forming surface comprises a parison mold.

* * * * *